United States Patent [19]

Cyr

[11] 4,407,215
[45] Oct. 4, 1983

[54] UNIQUE FAN-POWERED WATER VESSEL

[76] Inventor: Reno R. J. Cyr, 51 Burton St., Cranston, R.I. 02920

[21] Appl. No.: 330,559

[22] Filed: Dec. 14, 1981

[51] Int. Cl.³ .............................................. B63B 1/38
[52] U.S. Cl. .................................. 114/289; 114/288; 114/271; 440/69; 440/37
[58] Field of Search ........................... 280/43.2, 43.23; 114/344, 271, 288–290; 440/37, 69

[56] References Cited

U.S. PATENT DOCUMENTS

| | | | |
|---|---|---|---|
| 1,812,265 | 6/1931 | Hone | 114/67 A |
| 2,564,587 | 8/1951 | Sunstedt | 114/288 |
| 3,191,572 | 6/1965 | Wilson | 114/67 A |
| 3,203,389 | 8/1965 | Cale | 114/289 |
| 3,599,256 | 8/1971 | Carroll | 114/344 |
| 4,237,810 | 12/1980 | Westfall | 114/288 |
| 4,260,315 | 4/1981 | Bouffard | 280/43.23 |
| 4,284,027 | 8/1981 | Montez | 114/273 |

Primary Examiner—Trygve M. Blix
Assistant Examiner—C. T. Bartz
Attorney, Agent, or Firm—Robert J. Doherty

[57] ABSTRACT

A fan-powered water vessel in which an essentially flat-bottomed main hull portion is provided with a central friction reducing, relatively shallow tunnel whereby air forced into the forward portions thereof serves to form an air film between the major parts of the bottom of the boat and the supporting water surface. In addition, a pair of relatively narrow secondary tunnels are provided on either side of the central tunnel and are of a depth substantially greater than that of the central tunnel so as to confine the friction reducing air film between said secondary tunnels. This construction enables the boat to be utilized both on relatively calm inland waters and swamps as well as in choppy waters. An elevated bow provided at the forward section of the main hull divides and spreads waves to further enhance efficiency. The rear of the hull includes a power supply support housing including an air fan. In one preferred example, a trailer hauling hitch is provided at the bow section in combination with a pair of trailer wheels vertically movable into an operable position and supported in conjunction with the power housing.

11 Claims, 9 Drawing Figures

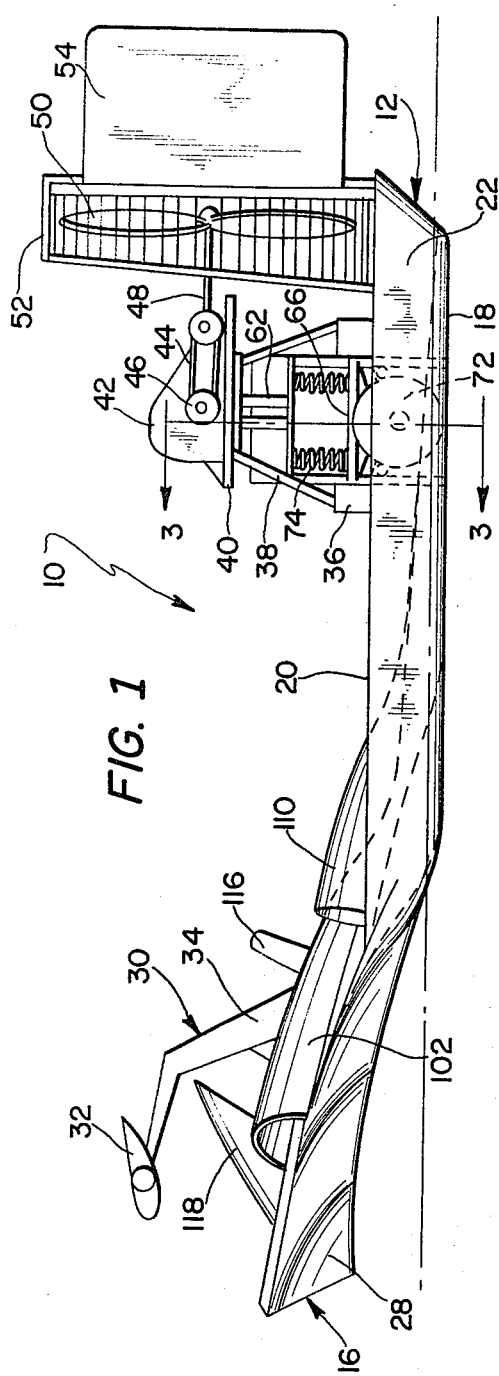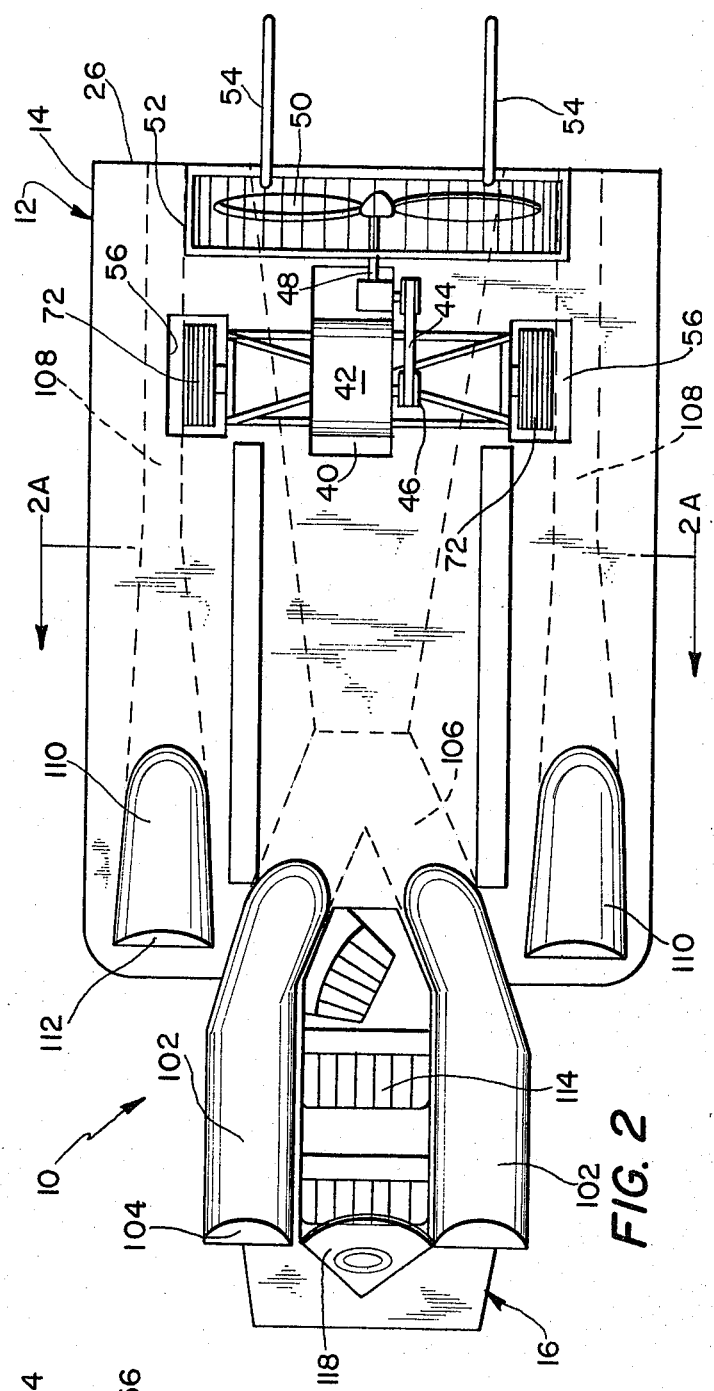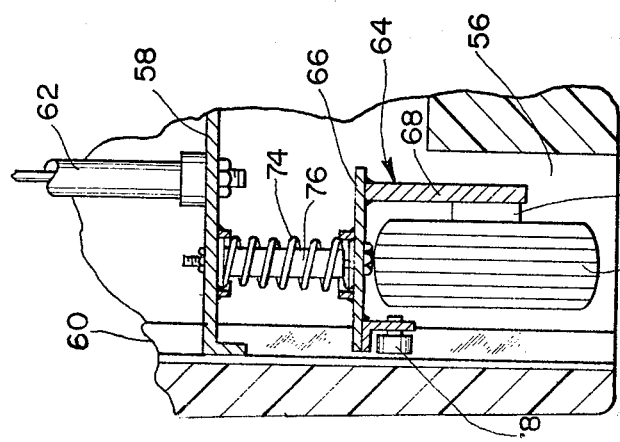

UNIQUE FAN-POWERED WATER VESSEL

BACKGROUND AND OBJECTS OF THE INVENTION

This invention deals with fan driven water craft and more particularly to an improved type hull construction which enables the boat utilizing such hull construction to be used for multiple purposes, that is, to be effective not only on inland, shallow, and relatively flat water surfaces but also as a close to shore ocean-going or lake craft. Vehicles of this type normally are considered limited to flat, shallow, and relatively calm waters such as present in the southern parts of this country and elsewhere. The relatively shallow draw that such vehicles produce enable them to be highly manuverable at high speeds on such water supporting surfaces. However, their use has been primarily restricted to such waters and until now have not been able to venture into lakes or on ocean bodies where the presence of waves or swells in the order of two to three feet (2 to 3 ft.) have substantially prevented their use. It is, accordingly, a primary object of the present invention to provide a craft of the above-indicated type which has multi purpose usage, that is, it is able to not only sustain its forward progression in a highly manuverable mode on flat, shallow water surfaces such as bayous, swamps, and the like, but also has added utility on lakes, nearby offshore ocean bodies, and the like.

A further object of the present invention is the provision of a craft or boat of the abovedescribed type which is trailable such that it may be conveniently moved from place to place over highways and roads.

These and other objects of the present invention are accomplished by the provision of an air-powered motor boat having a hull including an essentially flat bottom main section. A power supply including an air fan is supported by a power housing mounted on the upper surface of such main section. The flat bottom of said main section includes a centrally disposed relatively narrow depth tunnel longitudinally extending therealong and into which air from an air scoop mounted in the front thereof is adapted to flow between the bottom of the boat and the supporting surface of the water so as to reduce the frictional drag therebetween, i.e., produce a ground effect. In addition, a pair of opposed relatively deeper tunnels are provided on either side of the central tunnel so as to confine this ground effect air stream moving along the central bottom portions of the boat, that is, to prevent the supporting air stream from undesirably passing out to either side of the boat. The forward portion of the main hull section is provided with a relatively narrow longitudinally extending bow portion having a V-shaped prow which progressively widens and downwardly extends until it emerges with the forward portion of the main hull section so as to cut through and flatten moderate sized waves which the boat encounters. In addition, vertically retractable wheels are mounted within open bottom wells provided towards the rear of the main hull section so that such can be downwardly extended in order to form an integral tow mechanism for the boat.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a side elevational view of a preferred form of the boat construction of the present invention;

FIG. 2 is a top plan view thereof;

FIG. 3 is a partial sectional view on an enlarged scale taken along the line 3—3 of FIG. 1;

DESCRIPTION OF THE INVENTION

Figure 2A:
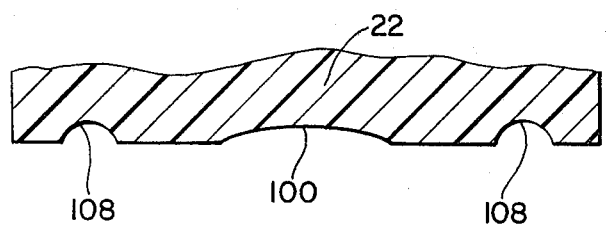
FIG. 2A is a sectional view taken along the line 2A—2A of FIG. 2.

Turning now to the drawings and particularly FIGS. 1 and 2 thereof, a preferred form of the boat 10 of the present invention is depicted. Such includes a hull 12 including an essentially flat bottom main section 14 and an outwardly, upwardly extending bow section 16. The main hull section 14, as previously indicated, is generally rectangular in shape and includes an essentially flat bottom surface 18, an equally flat upper surface 20 which forms a platform for receipt of operative devices that may be used in conjunction with the boat and connecting side walls 22. In addition, a front wall 24 appropriately slanted so as to receive water waves and swells is provided at the forward end of the main hull section 14 and an appropriately slanted rear wall 26 provided at the rear end thereof. The hull main section 14 may be formed of any appropriate material such as glass fiber reinforced plastic the like and may be provided with flotation devices or flotation material as is known in the art. Similarly, the bow section 16 may be fashioned from appropriate construction materials as well.

Figure 4:
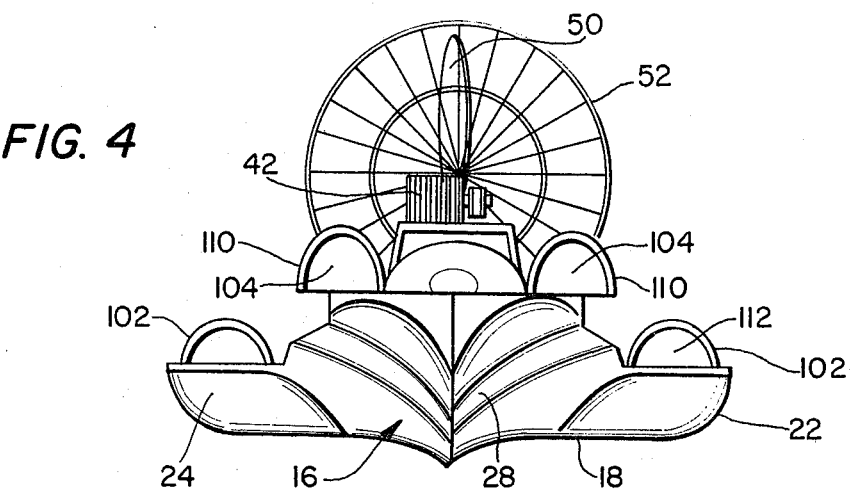
FIG. 4 is a front elevational view of the boat.

Also while the main hull section 14 includes a bottom surface 18 which is essentially flat and in complete contact with supporting water in which the boat operates, the bow section 16 is constructed so as to be relatively elevated therefrom. In such regard, the bow section 16 is provided with a V-shaped prow 28, the lower surface of which is preferably approximately 2½ or 3 feet above the water line while the boat 10 is at rest. Such prow 28 progressively widens and is simultaneously downwardly directed towards the rear so as to form a relatively smooth engagement with the central portion of the forward wall 24 of the main hull section 14 as is best shown in FIG. 4 of the drawings. The forward walls 24 of the hull section 14 form wing sections laterally extended to each side of the bow 16. A canard 30 is appropriately mounted on the top of the bow section 16 and includes an air foil 32 and a support frame 34 in turn attached to the upper part of the bow.

The upper surface 20 of the main hull section 14 serves as a platform for a power supply housing including supports 36 attached to the hull by any appropriate means and on which a frame 38 may be mounted. The frame 38 in turn supports a platform 40 on which a motor 42 is mounted. The motor 42 may be of any suitable design and includes marine as well as motorcycle engines. A transmission 44 transmits rotary motion from the drive shaft 46 of the engine 42 to a differential and drive shaft 48 of a large air fan or bladed propellor 50 suitably mounted in a screened housing 52. A pair of rudders 54 are mounted to the housing 52 for pivotal movement by means (not shown) such that the effective propulsion draft created by the fan 50 to the rear of the boat 10 may be effectively controlled so as to supply different vector forces to the boat and, accordingly, control its angular movement in the water.

A pair of open wells 56 extend through the body of the main hull section 14 and are disposed on laterally opposite sides of the engine platform 40. A vertically slidable plate 58 is mounted within the frame 38 and is adapted to engage rails 60 attached in an upright position on opposed sides of the wells 56. The plate 58 in turn supports a pair of piston assemblies 62 which are either operatively associated with the engine 42 or activated in some other known manner as by a source of hydraulic fluid (not shown) such that the plate 58 may be moved upwardly and downwardly within the frame 38. At each lateral extremity of the plate 58, a wheel assembly 64 is adapted to downwardly extend therefrom and project into the wells 56. Such wheel assembly includes a support plate 66 from which a secondary plate 68 downwardly extends and on which an axle is mounted for support of a tire 72. A coil spring 74 serves to connect plates 58 and 66 as does a shock absorber 76 mounted within the open central portion of such coil spring 74 and in this manner the wheel assembly 64 is resiliently supported by the plate 58. In addition, rollers 78 serves to guide the vertical movement of each wheel assembly 64.

Accordingly when it is desired to trailer the boat as over roads and the like, the pistons 62 are activated so as to downwardly move the plate 58 to a point where the wheels 72 project from the bottom of the open wells 56 such that the rear end of the boat is rollingly supported thereby. In order to support the bow section 16 of the boat 10, a generally U-shaped cradle 80 which is attached to a sectional or rigid, upwardly bowed tow bar 82 may be utilized. The tow bar 82 terminates at its outer end in an upwardly extending plate-like finger 84 having a transverse opening 86 disposed therein. The finger 84 is adapted to extend into a slot 88 provided in the bottom of the prow 28 and be fastened therein by pin means (not shown). The forward end of the tow bar 82 may be connected to a standard trailer hitch 90 and in this manner the boat towed from place to place between marine uses in a convenient and straightforward manner without necessitating the use of an overall cradle on which the boat is carried. In other words, the supporting wheel assemblies are an integral part of the boat itself and, accordingly, eliminate the need of a separate trailer and, accordingly, more expensive unit for such purpose.

Under operation, rotation of the fan 50 provides the forward propulsion by which the boat 10 moves through the water. The pivotal movement of the rudders 54 directs the air flow created by the fan 50 and, accordingly, the direction in which the boat is urged. As the boat picks up speed, the air foil 32 provides a downward force upon the bow 16 of the boat in order that a generally level attitude of the boat vis-a-vis the supporting water surface is maintained. In addition, the V-shaped prow and its progressive rearward and downward flaring and ultimate merging with the front wall 24 of the hull section 14 enables small waves and swells in the order of 2½ to 3 feet maximum height to be cut and progressively flattened so as to reduce the frictional movement of the boat through the water and to avoid slapping of the prow against oncoming waves and swells. In other words, the distinctive front shape of the bow creates a desirable snow plow effect, yet permits the craft to ride the groove created and rise over the main density of wave action.

Figure 5:
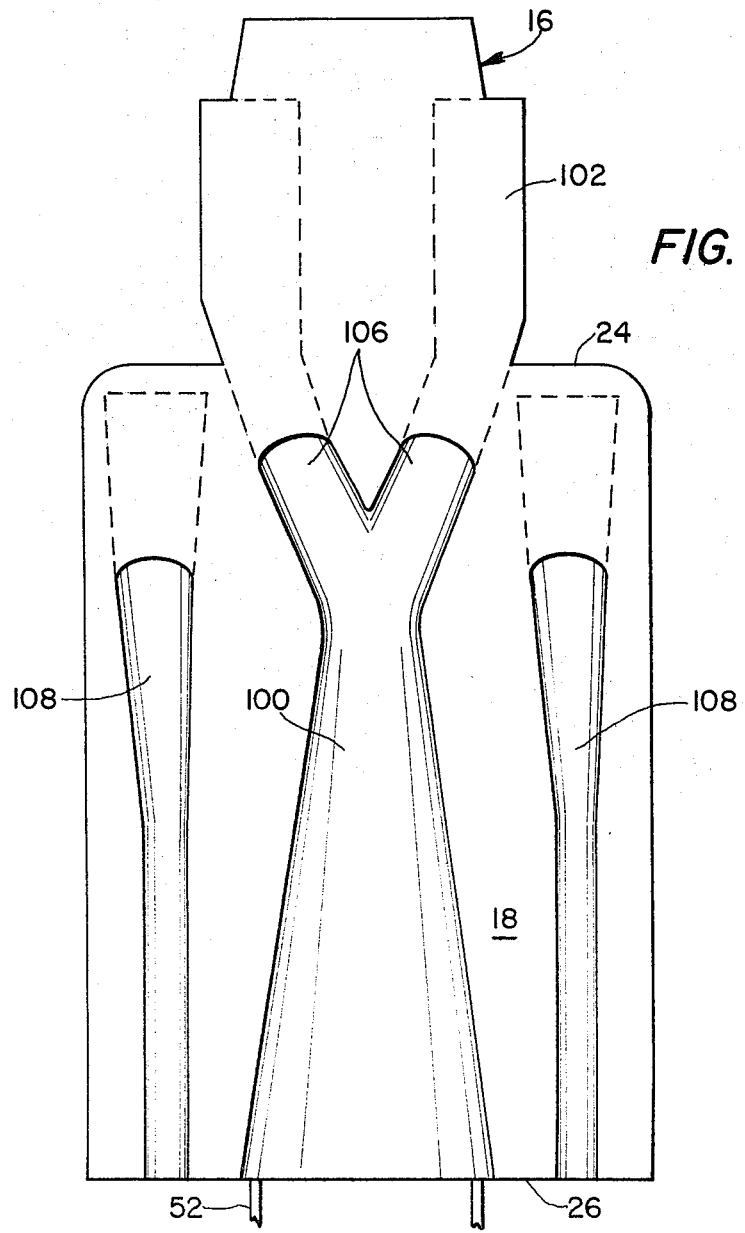
FIG. 5 is a bottom plan view thereof with parts removed for clarity.
Figure 6:
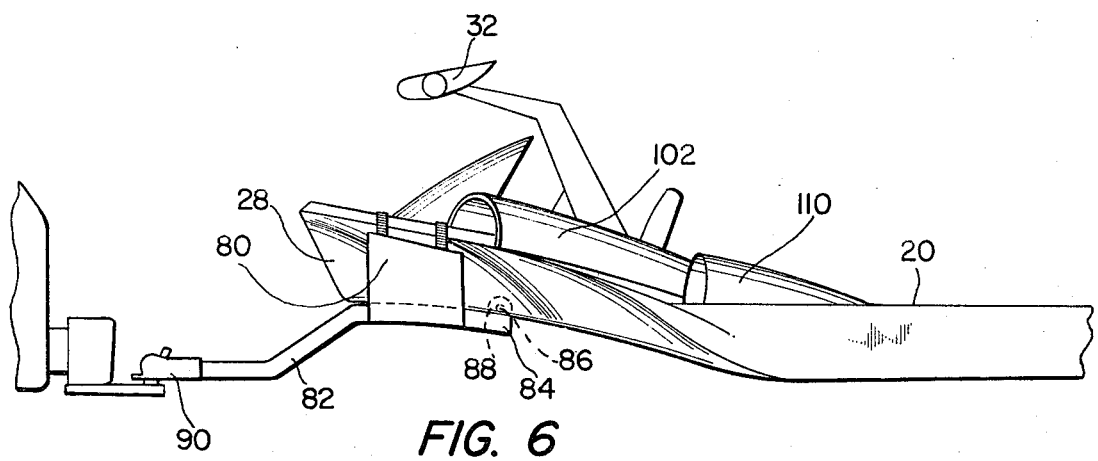
FIG. 6 is a partial side elevational view thereof showing the manner in which a bow supporting tow member can be utilized to trailer the vehicle.

A key feature of the present boat construction is the incorporation of means for reducing the frictional drag between the supporting water surface and the generally flat bottom 18 of the hull section 14. This is accomplished by the introduction of an air film from the forward portion of the boat over a significant portion of the bottom 18 to in effect "lift", i.e., create a ground effect between the boat and the water. Such is accomplished by the provision of a primary and centrally disposed air tunnel 100 into the bottom thereof. The air tunnel is of a rather shallow cross sectional configuration and progressively widens towards the rear of the hull section 14. Such configuration is best shown by reference to FIGS. 2A and 5 of the drawings. The depth or height of the tunnel becomes progressively shallower as it approaches the rear of the boat as well. As the rotation of the fan drives the boat forward, air is forced into the tunnel 100 by means of a pair of scoops 102 laterally disposed to each side of the bow 16. Such scoops 102 are open at the forward end 104 thereof and are of generally tubular configuration and direct the air flow into the tunnel 100 directly there into or by means of a cross chamber 106 and preferably at a shallow angle and approaching a tangential relationship with the bottom 18 of the hull section 14. In this manner then, an air film is forced beneath the bottom of the boat 10 so as to in effect support or lift the same.

It is also desirable to introduce the air flow beneath the bottom of the boat at a point generally proximal but spaced from the front wall 24 thereof. It may be seen therefore that the central tunnel 100 and its secondary portion 106 are of a generally equal volume throughout the longitudinal extent thereof but that the actual height or thickness of the tunnel at varying locations therealong may vary in order that a generally equal velocity of the air forced beneath the central portion of the hull 14 is brought about. The air flow beneath the bottom of the boat in many cases has a tendency to flare out more quickly or at a greater angle then intended so as to escape from the confines of the tunnel 100 and in effect bubble out at points on the sides 22 of the hull 14 especially when the boat is making extensive side to side maneuvers or turns. This effect is eliminated or at least effectively controlled by a pair of secondary tunnels 108 formed on opposite sides of the central tunnel 100 and which extend into the bottom of the hull 14 a greater thickness but of a materially lesser width than the central tunnel 100. The forward portions of the tunnels 108 are connected by air scoops 110 similar to the previously described air scoops 102 and including an open face 112. Air is forced through the scoops 110 and into the tunnels or channels 108 at a velocity materially greater than that present in the main tunnel 100; and, accordingly, the air film tends to be confined in the desired central areas of the hull 14. Also the air is introduced into the tunnels 108 at a slightly steeper angle and at a point rearwardly of the introduction of air into the central tunnel such that the air flow in the tunnels 108 is confined to a deeper and narrower channel and, accordingly, moves at a higher velocity such that it confines the primary supporting air film present to its tunnel 100.

A cockpit area 114 is defined between the air scoops 102 and projects downwardly into the prow 16 such that the boat crew may be somewhat protected thereby. Seats 116 are included and a windshield 118 may also be provided. As previously mentioned, the upper surface 20 of the hull section 14 may facilitate the mounting of various equipment and apparatus thereon. It may also be used for the storage of material. It should also be brought out that in addition to normal peaceful uses which the above boat is designed for, it has further utility as a military craft in that such cases weapons may be mounted on the platform formed by the surface 20.

Figure 7:
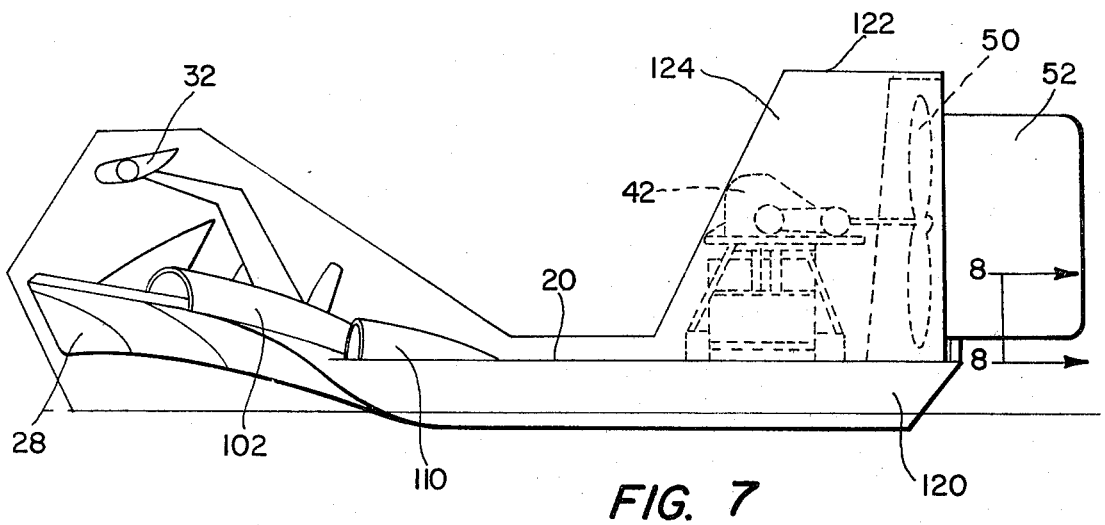
FIG. 7 is a side elevational view similar to FIG. 1 but showing the schematic of reflective shields on either side of the boat.
Figure 8:
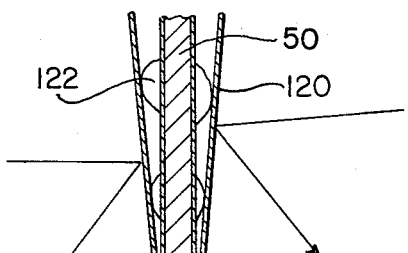
FIG. 8 is a partial sectional view taken through the rudder assembly thereof and shows one manner in which such shields may be positioned.

When used as a military craft, the boat 10 may also be provided with low visibility reflective shields 120 that may be mounted in an upright position and of a configuration large enough so as to hide or mask the elevational outline of the boat when viewed from the side as shown in FIG. 7. Such shields 120 are generally of a lightweight material, for instance, metal or metal foil and plastic, and may include a frame 122 on which metalized plastic materials such as mirrorized semi-flexible acrylic plastic and the like 124 is affixed or otherwise supported. The outer surface of such metal or metalized material 124 is highly reflective such that the viewer when observing the craft in elevation from the side will tend to see only the reflection of the mirror-like surface in the water. For this purpose, the shields 120 may be angled to some extent as shown in FIG. 8 as by the insertion of spacer elements 122 formed from an appropriate material such as flexible resin foam with the desired result that the craft is essentially unnoticeable as it moves through the water. Of course, the movement caused in the water as well as the noise created by such boat cannot be as effectively masked as its physical outline in the manner above-described.

Accordingly, the above-indicated objects of the invention are accomplished by this novel boat construction. Part of the reason for such is that the present boat is designed aerodynamically first and hydrodynamically second. Thus, air is introduced to the rear of the hull prior to reaching planing velocity. This is important because if air is introduced to the rear hull via the forward portion of the underside, the forward speed of the craft and the uncontrolled volume of forward air rushing beneath the front hull immediately to the rear can cause the craft to flip backwards. The present construction avoids this possibility by bringing air to the rear hull via the air scoops before such can take place.

Also, "air boats" have a tendency to "porpoise", which is a "leap frog" action of the craft in the water. This is caused by the design and construction of the boat. since "air boats" are of simple construction, like a bathtub with an engine, the weight is disproportionate and compensated for by horsepower. The present aerodynamically designed boat can, however, achieve the same high velocities of such boats but at about half the horsepower demand.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A multi-purpose air powered boat having a hull including an essentially flat bottom main section and an upper surface in turn supporting a power housing generally centrally disposed and in turn including an air propellor mounted at the rear thereof and a power supply for rotating said propellor supported by said power housing, said flat bottom main section including a centrally disposed relatively narrow depth, open bottom air tunnel of substantial width longitudinally extending from a point proximate the front to the rear of said main section and a pair of secondary air tunnels positioned on opposite sides of said central tunnel and proximate the side edges of said main section, said secondary tunnels extending into the said flat bottom a depth substantially greater than and of a width substantially less than said central tunnel, and air scoop means disposed at the front of said boat for separately receiving air flow into said tunnels when said boat is forwardly driven by said propellor wherein air is forced between said flat bottom and the supporting water surface to form an air cushion to reduce the frictional contact therebetween primarily by said main tunnel and to provide high velocity air flow of a supporting nature to the tunnels, and whereby the lateral extent of said air cushion is controlled by the air flow through said secondary air tunnels, said air scoop means including separate air scoops connected to the front of each of said tunnels, and wherein said air scoop means include substantially tubular uninterrupted passageways directly merging into said tunnels and of a cross-sectional extent so as to move air through the tunnels to which they are associated at a speed at least equal to that at which the air moves through said passageways, the air scoop passageway means connected to said main tunnel permitting a substantially larger volume of air to be directed thereto than the individual air scoops permit to be directed to said secondary tunnels.

2. The boat construction of claim 1, said passageways connected to said secondary tunnels of a substantially greater air volume capacity at their forward ends than at their connections with said secondary tunnels such that air is forced into said secondary tunnels at a velocity substantially higher than that in the main tunnel.

3. The boat construction of claim 1, said main tunnel disposed forwardly of said secondary tunnels such that said air cushion contacts the boat bottom centrally prior to the longitudinal position at which the controlling air flows of said secondary tunnels contact said boat bottom.

4. The boat construction of claim 3, said central tunnel being of a progressively greater width from front to rear such that it terminates in a shallow slot at the rear of said hull main section which slot extends over a major extent of the width thereof.

5. The boat construction of claim 4, said secondary tunnels being of relatively constant width and depth from front to rear of said hull main section and the air flow entering the forward portions thereof is directed into the water on which said boat is supported at a relatively steeper angle than that which the air entering said central tunnel is directed.

6. The boat construction of claim 1, said hull including a forward bow portion of narrower width than the front of said main section and having a V-shaped prow, the forward portion thereof normally extending above the water line and thereafter simultaneously progressively widening and extending downwardly in a front to rear direction until the bottom of such bow smoothly centrally interconnects with a forward portion of said main section such that portions of said main section laterally extend to each side of said bow to form opposed wing segments, said air scoops for said secondary tunnels disposed on said wing segments and said air scoop means for said central tunnel disposed on said bow.

7. The boat construction of claim 6, said bow including a passenger cockpit centrally disposed between a pair or air scoops in turn disposed on opposite sides of said bow, said air scoops open at the fronts thereof and thereafter extending rearwardly and downwardly to an area where said scoops converge with said central tunnel.

8. The air boat construction of claim 1, said hull main section including a pair of wheels supported proximal the rear thereof in a pair of open wells and adapted for downward vertical movement to a position at least partially extending out of said wells such that the wheels can rollingly support said hull.

9. The air boat construction of claim 8, said wheels resiliently supported from a vertically movable frame, said frame in turn supported from said power housing.

10. The air boat construction of claims 6 or 8, including a tow connector mounted in a central portion of the lower surface of said bow wherein a tow bar having a bow supporting cradle may be affixed to said connector for towing said boat on land.

11. The air boat construction set forth in claim 7 including an air foil mounted above and slightly forward of said cockpit for exerting a downward force upon the bow.

* * * * *